United States Patent
Naam et al.

(10) Patent No.: US 8,005,810 B2
(45) Date of Patent: Aug. 23, 2011

(54) SCOPING AND BIASING SEARCH TO USER PREFERRED DOMAINS OR BLOGS

(75) Inventors: Ramez Naam, Seattle, WA (US);
Randall F. Kern, Seattle, WA (US);
Oliver Hurst-Hiller, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 535 days.

(21) Appl. No.: 11/239,810

(22) Filed: Sep. 30, 2005

(65) Prior Publication Data
US 2007/0078854 A1    Apr. 5, 2007

(51) Int. Cl.
G06F 7/00      (2006.01)
G06F 17/30     (2006.01)
(52) U.S. Cl. .......................... 707/706; 707/709
(58) Field of Classification Search .............. 707/3, 10, 707/706, 709
See application file for complete search history.

(56) References Cited

U.S. PATENT DOCUMENTS

| | | | | |
|---|---|---|---|---|
| 6,636,848 | B1 * | 10/2003 | Aridor et al. | 707/3 |
| 2004/0002947 | A1 * | 1/2004 | De La Fuente et al. | 707/1 |
| 2006/0026147 | A1 * | 2/2006 | Cone et al. | 707/3 |
| 2007/0038603 | A1 * | 2/2007 | Guha | 707/3 |
| 2008/0077570 | A1 * | 3/2008 | Tang et al. | 707/5 |

OTHER PUBLICATIONS

Google, Our Search: Special Features "Special Features of Google" (http://web.archive.org/web/20001201201400/http:/www.google.com/intl/en/help/features.html), Jan. 20, 2000, pp. 1-4.*

* cited by examiner

*Primary Examiner* — Apu M Mofiz
*Assistant Examiner* — Jared M Bibbee
(74) *Attorney, Agent, or Firm* — Shook, Hardy & Bacon L.L.P.

(57) ABSTRACT

Architecture that allows a user to search for content or to restrict an online search to a limited number of websites and/or blog sites. Architecture is provided that facilitates data searching via a source component that includes data representative of a website or a blog, and a search component that processes the data to restrict or bias a query based in part on the data. The source component can include one or more of a favorites list, a blogroll, a pointer to an XML file, or a pointer to an OPML (outline processor markup language) file to specify a list of sites or blogs which they frequent. The search component processes a search query and restricts or biases the search by specifying a list of sites or blogs which are contained in the data of the source component, for example, the favorites list, the pointer to an XML file, the pointer to an OPML file, and the blogroll.

13 Claims, 14 Drawing Sheets

SCOPING AND BIASING SEARCH TO USER PREFERRED DOMAINS OR BLOGS

BACKGROUND

A weblog, most often referred to as a "blog" is a web-based publication consisting most frequently of periodicals. Effectively, blogs enable web-based communities to exist, share ideas and communicate with regard to a wide variety of topics. The articles are most often arranged in reverse chronological order (e.g., the most recent appearing first). Conventionally, blogs were manually created and updated. However, with the increase in popularity, recent developments have emerged that include tools that facilitate automating the creation and/or maintenance of blogs.

Today, the range of categories of blogs is countless. For instance, blog content topics can range from geographically focused topics and points of interest to political topics. Political candidates and supporters often use blogging mechanisms and sites to reach out to other fellow supporters. The scope of topics is endless.

While some blogs are written by a solo author, others are written by a group of authors. Sometimes the blog is interactive (e.g., allowing a visitor or reader to leave a public and/or private comment). On the other hand, sometimes, they are not interactive effectively operating as a way to disperse information.

Traditionally, a blogger would employ a personal software package to assist in creating a blog. Today, the availability of blog hosting sites and Web services to provide editing via the Web has proliferated. As well, blog generation tools have continued to evolve and emerge to provide the blogger with greater flexibility and power in creating a blog.

Today, with the increased popularity, blogging has essentially combined a personal web page with tools to make linking to other pages easier. More particularly, track-backs, as well as comment are common mechanisms of blogs thus increasing penetration and interest. With these mechanisms, virtually any reader or visitor to a blog is able to participate by posting a comment or linking from an external blog (e.g., track-back).

Generally, a track-back is a mechanism that represents a first blog that is referenced in a second blog whereas a link to the first blog is provided in the second blog. For example, a blog can provide track-backs to other blogs of a similar topic or to other blogs that the blogger may think provide relevant information to a specific blog community. A comment is a mechanism that permits a reader or visitor to post a remark, thought or opinion on a particular topic or thread. The comments increase the interactivity and participation of a particular blog. For example, readers can post answers to questions, opinions on topics, etc.

With the increase in popularity of blogs comes an increase in content volume. As such, searching blogs results in blog readers being inundated with blog items relating to a subject or topic. The capability does not currently exist to allow a user to more specifically focus a search. Currently, no effective manner of rating, filtering and/or focusing blog items to a user are available. Therefore, a user is forced to sift through the voluminous number of blog items with hopes to locate items of interest.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

In many cases, blog users wish to search for content on the Internet, but only within one website and/or blog site. In other cases, users wish to search the web, but bias the results towards these websites and/or blogs. The disclosed innovation enables a user to limit the scope of an online search to those desired website and/or blog sites.

Accordingly, the invention disclosed and claimed herein, in one aspect thereof, comprises a system that facilitates data searching in accordance with an innovate aspect. The system comprises a source component that includes data representative of a website or a blog, and a search component that processes the data to restrict or bias a query based in part on the data. In one implementation, the source component can include one or more of a favorites list, a blogroll, a pointer to an XML file, or a pointer to an OPML (outline processor markup language) file to specify a list of sites or blogs which they frequent. The search component processes a search query and restricts or biases the search by specifying a list of sites or blogs which are contained in the data of the source component, for example, the favorites list, the pointer to an XML file, the pointer to an OPML file, and the blogroll.

In another aspect, a search can be extended to multiple secondary sites as defined in files that are searched via the initial query.

In yet another aspect thereof, a file source can be defined by a user login such that when the user logs in to a system, the source file for the search query is automatically assigned to the source file.

In still another aspect of the subject innovation, the search component can include a query parser component that at least retrieves the data associated with a desired websites and/or blogs, extracts that information, and incorporates the information into the query. An execution component of the search component facilitates efficient filtering or biasing of results to the set of websites or blogs specified. The search component can also include an index component that stores and exposes correct metadata structures to enable the efficient execution of such queries.

In another aspect, the system determines if a second search is required to be made based on adequacy of results of a first search conducted.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
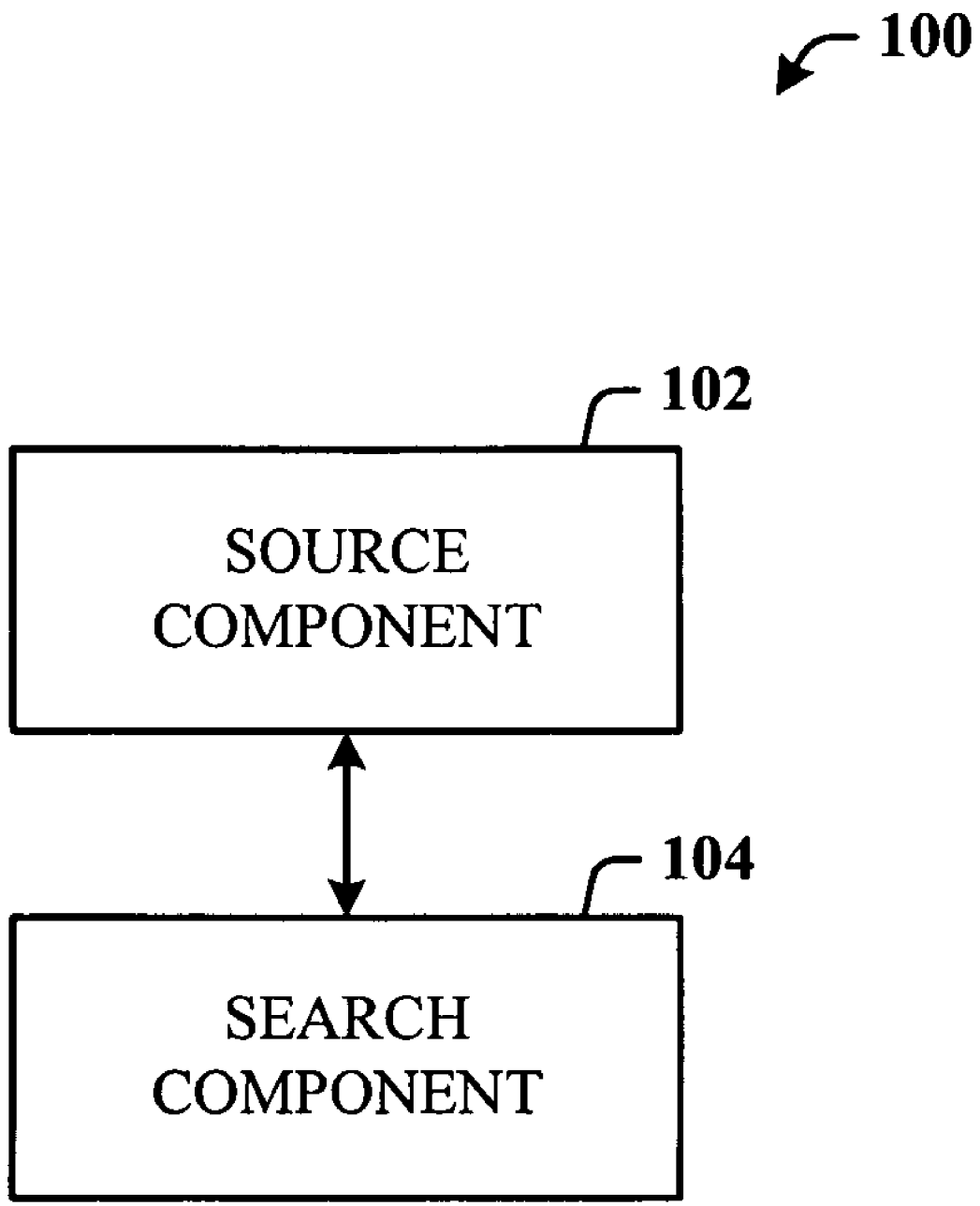
FIG. 1 illustrates a system that facilitates data searching in accordance with an innovate aspect.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Referring initially to the drawings, FIG. 1 illustrates a system 100 that facilitates data searching in accordance with an innovate aspect. The system 100 comprises a source component 102 that includes data representative of a website or a blog, and a search component 104 that processes the data to restrict or bias a query based in part on the data. In one implementation, the source component 102 can include one or more of a favorites list, a blogroll (a part of a blog which lists links to other blogs), a pointer to an XML (extensible markup language) file, or a pointer to an OPML (outline processor markup language) file to specify a list of sites or blogs which they frequent.

Additionally, in many cases, blog users wish to search for content on the Internet (also referred to herein as the "web"), but only within one website and/or blog. In other cases, users wish to search the web, but bias the results towards these websites and/or blogs. Accordingly, the disclosed innovation enables a user to limit the scope of an online search.

The search component 104 processes a search query and restricts or biases the search by specifying a list of sites or blogs which are contained in the data of the source component 102, for example, the favorites list, the pointer to an XML file, the pointer to an OPML file, and the blogroll.

Figure 2:
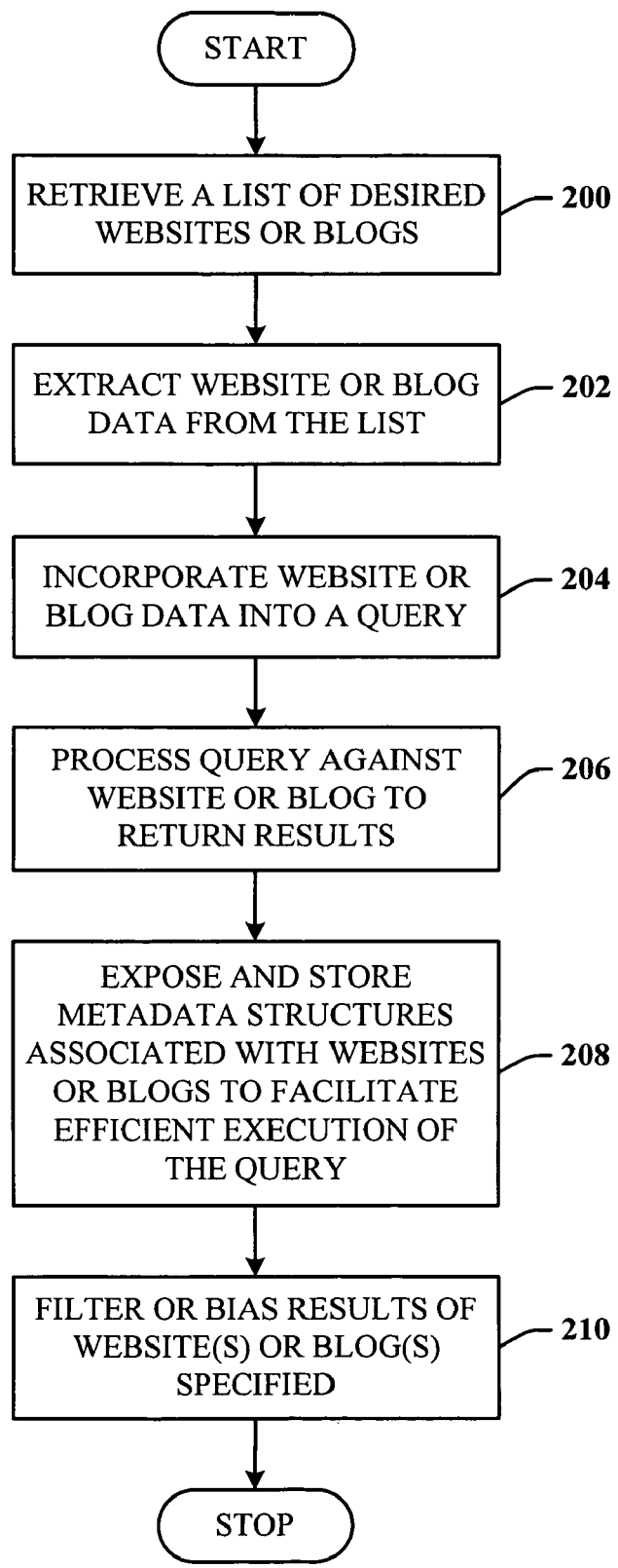
FIG. 2 illustrates a methodology of limiting a search in accordance with the subject innovation.

FIG. 2 illustrates a methodology of limiting a search in accordance with the subject innovation. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a list or datasource of desired website and/or blogs is retrieved for processing. At 202, the website and/or blog information is extracted from the list or datasource. At 204, the website and/or blog data is incorporated into a query. At 206, the query is processed against the website and/or blog to return results. At 208, metadata structures associated with the website and/or blog are exposed and stored to facilitate efficient execution of the query. At 210, the results are filtered or biased based on the website(s) and/or blog(s).

Figure 3:
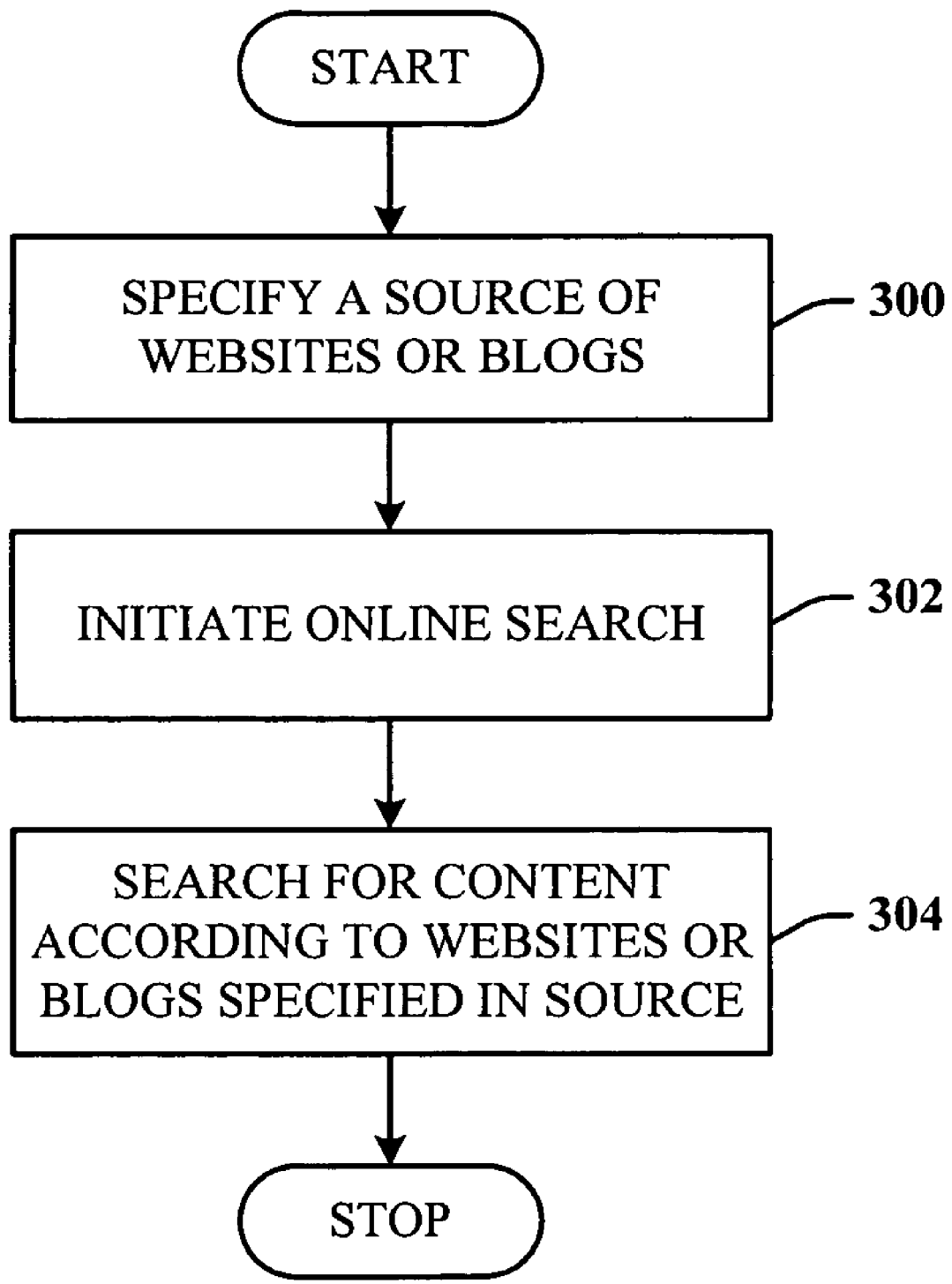
FIG. 3 illustrates a methodology of limiting a content search in accordance with another aspect.

Referring now to FIG. 3, there is illustrated a methodology of limiting a content search in accordance with another aspect. At 300, a source that provides a location of a website and/or a blog is specified in query syntax. At 302, an online search is initiated based on the query. At 304, content of the website and/or blog specified in the query is searched, and results returned to the user.

Figure 4:
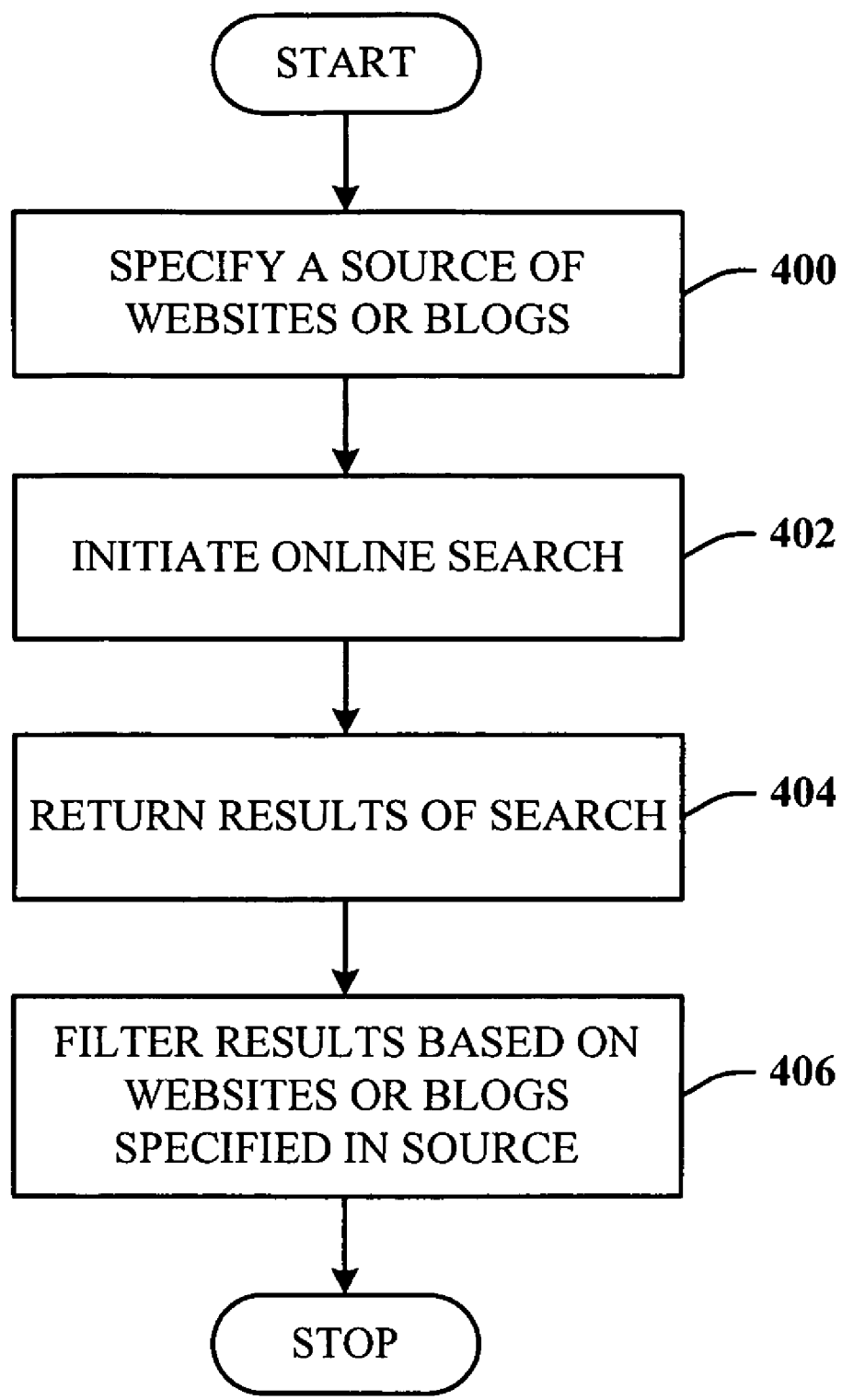
FIG. 4 illustrates a methodology of limiting a search based on bias towards the website and/or blog being searched in accordance with another aspect of the innovation.

FIG. 4 illustrates a methodology of limiting a search based on bias towards the website and/or blog being searched in accordance with another aspect of the innovation. At 400, a source of websites and/or blogs is specified in search syntax. At 402, an online search is initiated. At 404, the search results are returned. At 406, the results are then filtered based on the website and/or blog specified in the source.

Figure 5:
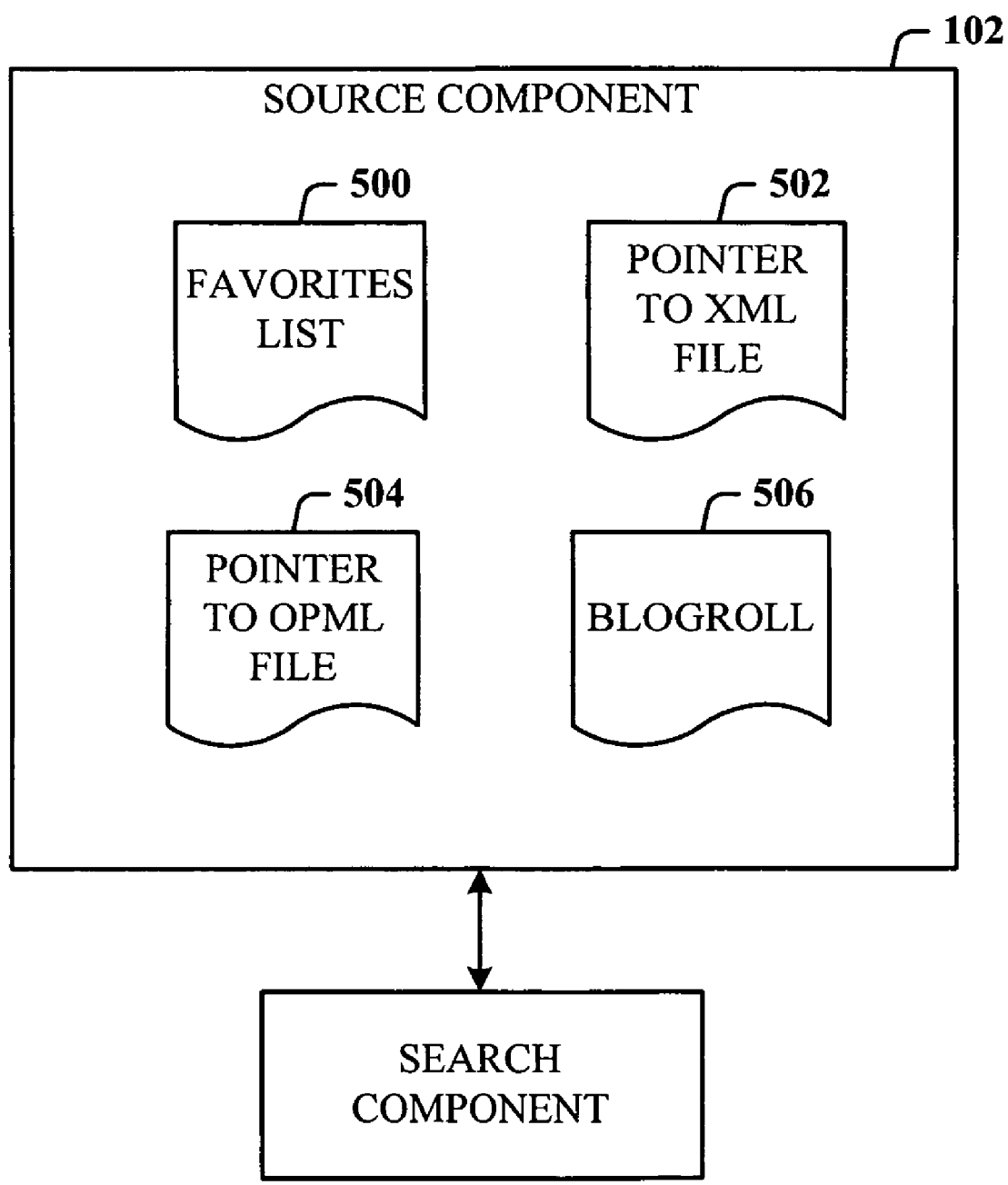
FIG. 5 illustrates a more detailed diagram of the types of data that can be provided by the source component of FIG. 1.

FIG. 5 illustrates a more detailed diagram of the types of data that can be provided by the source component 102 of FIG. 1. As indicated supra, the types of data that can be utilized include a favorites list 500 which is a listing of frequently-accessed websites and/or blogs, a pointer to an XML file 502, a pointer to an OPML file 504, and a blogroll 506.

Figure 6:
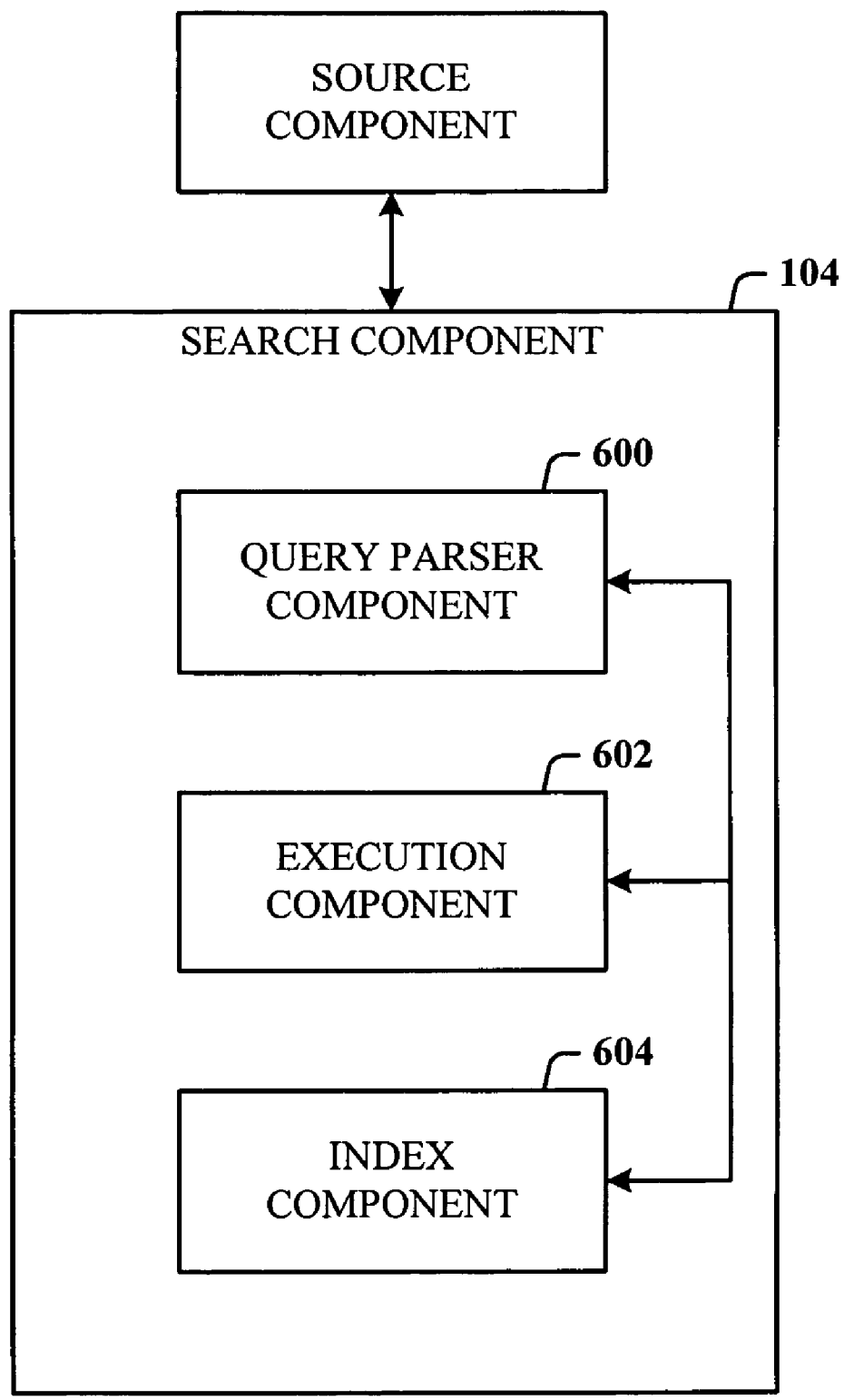
FIG. 6 illustrates a more detailed diagram of components of the search component of FIG. 1.

Referring now to FIG. 6, there is illustrated a more detailed diagram of components of the search component 104 of FIG. 1. The search component 104 can include a query parser component 600 that at least retrieves the data associated with a desired websites and/or blogs, extracts that information, and incorporates the information into the query. An execution component 602 of the search component 104 facilitates efficient filtering or biasing of results to the set of websites or blogs specified. The search component 104 can also include an index component 604 that stores and exposes correct metadata structures to enable the efficient execution of such queries.

Figure 7:
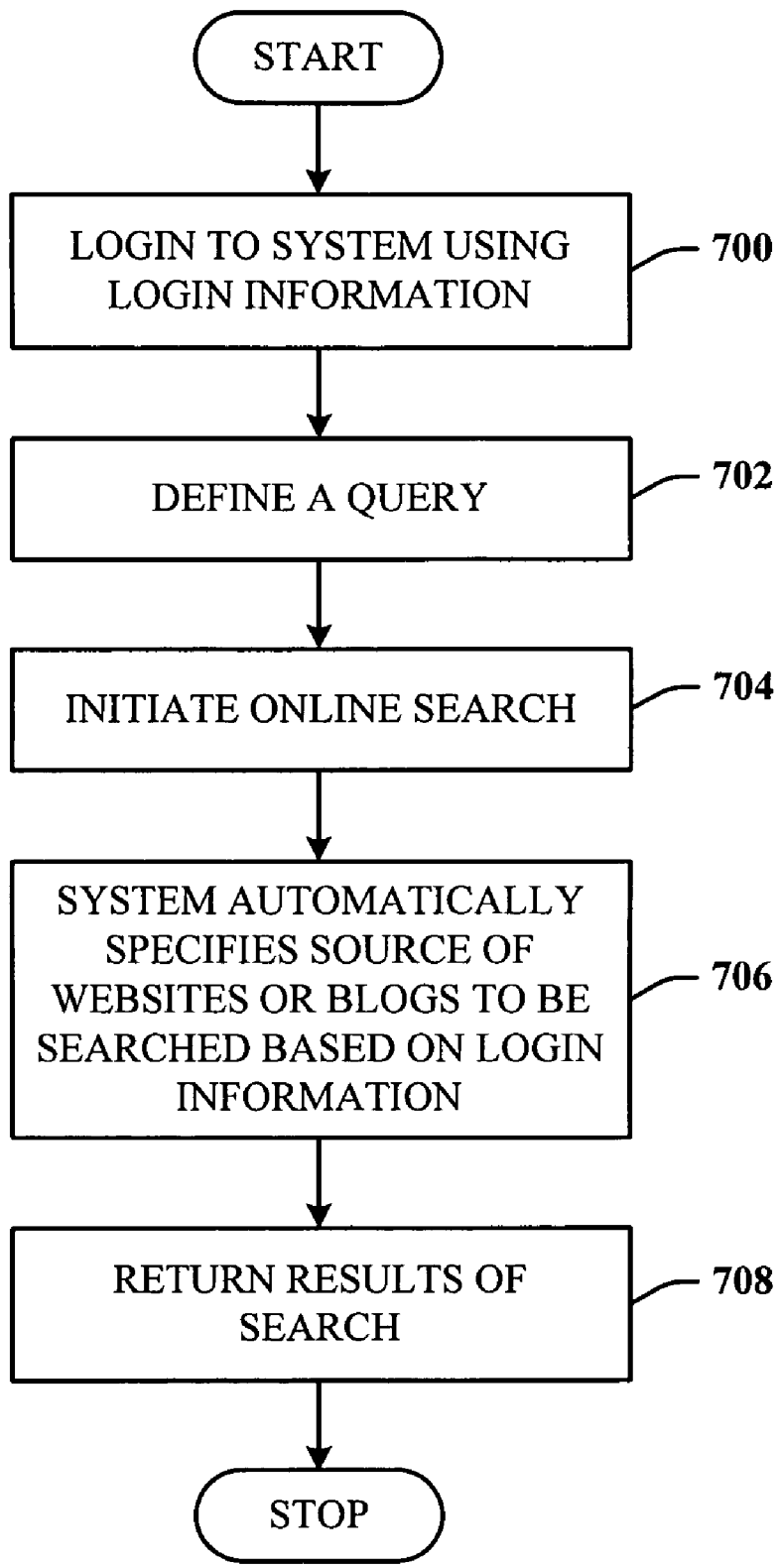
FIG. 7 illustrates a methodology of determining a source of a search destination based upon a user login.

FIG. 7 illustrates a methodology of determining a source of a search destination based upon a user login. At 700, a user logs-in to the system using login information. This can include username and password or other related information such as an e-mail address, for example. At 702, the user defines a query that will be used for searching a network of data sources. At 704, the user then initiates an online search. Note that "online" in this context means a network-based search such as via the Internet, for example. At 706, the system automatically specifies the source of the website and/or blog information to be searched based on the user login information. As indicated supra, this can be a favorites list, a pointer to an OPML file, a pointer to an XML file, and a blogroll. At 708, the search returns results.

Figure 8:
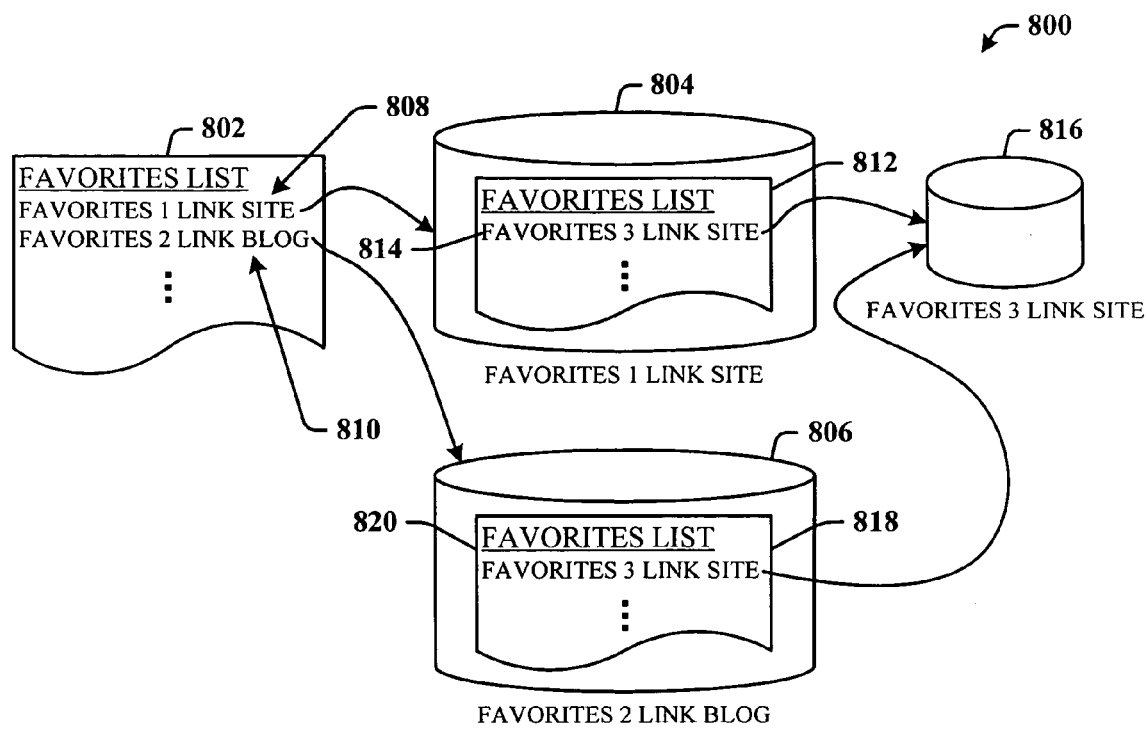
FIG. 8 illustrates a system that utilizes a favorites list to link to a website and/or blog site.

FIG. 8 illustrates a system 800 that utilizes a favorites list 802 to link to a website 804 and/or blog site 806. The favorites list 802 can include a number of links. For example, a first link 808 includes destination information FAVORITES 1 LINK SITE that directs a query to the associated website 804 (denoted FAVORITES 1 LINK SITE). The search can then be restricted to content of the website 804. The favorites list 802 can also include a second link 810 which includes destination information FAVORITES 2 LINK BLOG that directs a second query to the associated blog 806 (denoted FAVORITES 2 LINK BLOG). The second search can then be restricted to content of the blog 806.

In another implementation, the website 804 can further employ a favorites list 812 such that the first search not only includes content of the website 804, but is also extended to a website or blog identified by a link 814 FAVORITES 3 LINK SITE, which extends the search to content of a second site 816 (denoted FAVORITES 3 LINK SITE). The blog site 806 can also include a favorites list 818 which includes a link 820 FAVORITES 3 LINK SITE that points to the second site 816.

It is to be appreciated that the query can define a single favorites list or multiple favorites lists. Additionally, the query can define a single favorites list, but multiple different links contained therein to extend the search to websites, blog sites and both websites and blog sites.

Figure 9:
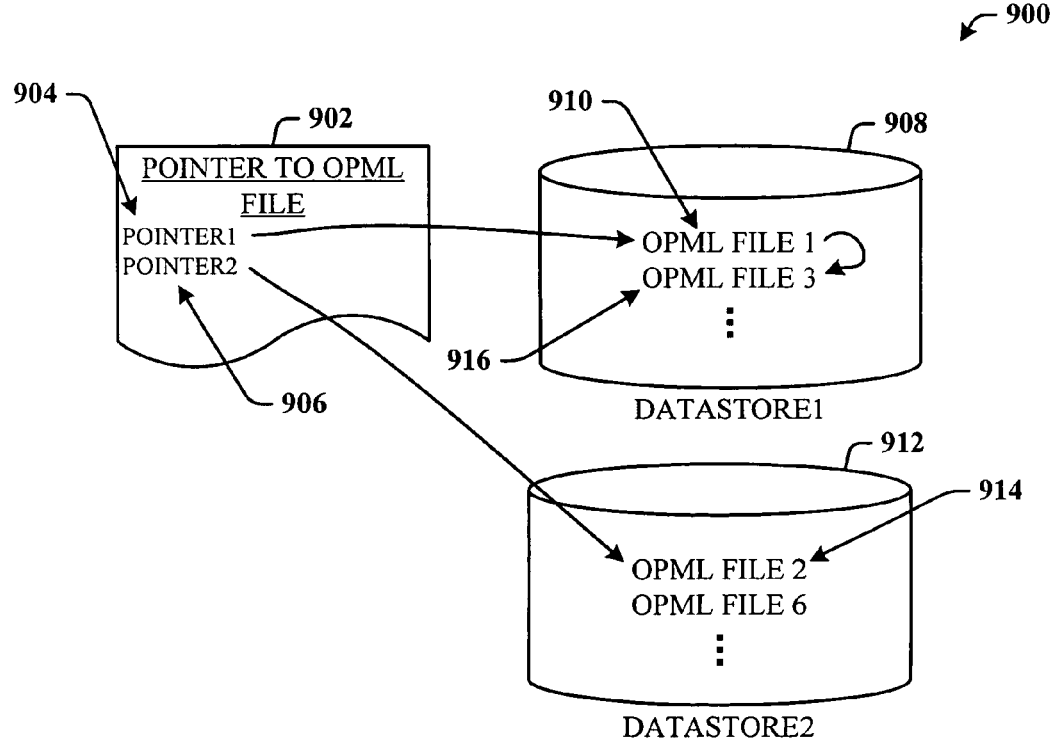
FIG. 9 illustrates a system that utilizes a datasource that includes a pointer to an OPML file to link to one or more datastores.

FIG. 9 illustrates a system 900 that utilizes a datasource 902 that includes a pointer to an OPML file to link to one or more datastores. Here, the datasource 902 includes a first pointer 904 (denoted POINTER1) and a second pointer 906 (denoted POINTER1). The first pointer 904 includes information that points to a first datastore 908 which includes one or more OPML files (denoted OPML FILE 1, OPML FILE 3 . . . ). Here, the first pointer 904 points to a first OPML file 910. In one implementation, the search is limited to the first datastore 908 at which the first OPML file 910 resides. Alternatively, the first OPML file 910 is processed to extract destination information of other sites to which the search is extended and which associated content is searched.

The second pointer 906 includes information that points to a second datastore 912 which includes one or more OPML files (denoted OPML FILE 2, OPML FILE 6 . . . ). Here, the second pointer 906 points to a second OPML file 914. In one implementation, the search is limited to the second datastore 912 at which the second OPML file 914 resides. Alternatively, the second OPML file 914 is processed to extract destination information of other blog sites to which the search is extended and which associated content is searched.

It is to be appreciated that the query can define a single pointer (e.g., POINTER1 904) in a list of pointers of the datasource 902. Alternatively, the query can define multiple pointers (e.g., POINTER1 904 and POINTER2 906) of the datasource 902, such that the multiple pointers extend the search to websites, blog sites and, both websites and blog sites. Note that it is to be appreciated that the first OPML file 910 can include a pointer that links to a third OPML file 916 (denoted OPML FILE 3) of the same location (e.g., first datasource 908). Thereafter, the search can be restricted to the first datasource 908, or extended to other websites and/or blogs defined by destination information contained within the third OPML file 916.

Figure 10:
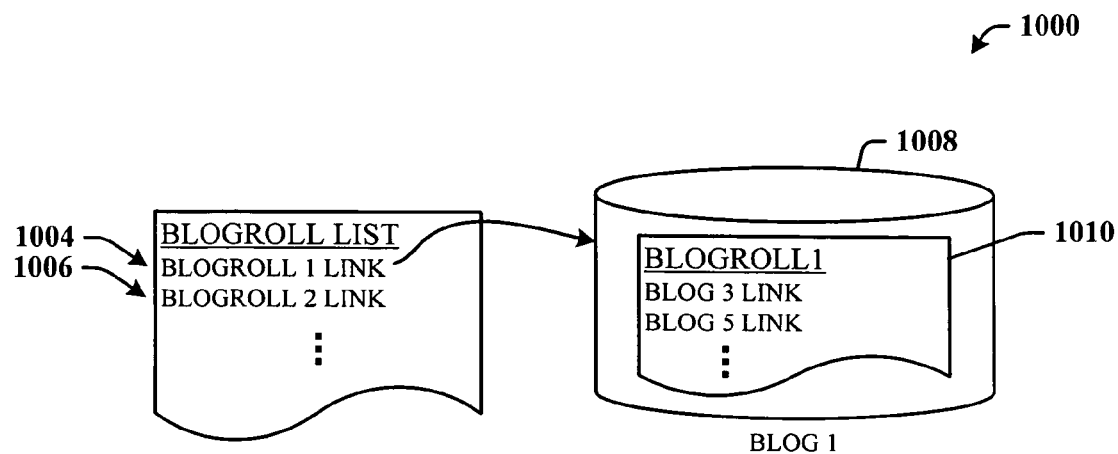
FIG. 10 illustrates a system that utilizes a datasource which includes a blogroll that provides a link to a datastore.

FIG. 10 illustrates a system 1000 that utilizes a datasource 1002 which includes a blogroll that provides a link to a datastore. The datasource 1002 includes a blogroll having at least a first link 1004 (denoted BLOGROLL 1 LINK) and a second link 1006 (denoted BLOGROLL 2 LINK). The first link 1004 directs the search query to an associated blog site 1008. The search can be limited to the blog site 1008, only, or extended to another site as identified in a blogroll 1010 of the blog site 1008.

It is to be appreciated that the query can define a single blogroll link (e.g., BLOGROLL 1 LINK 1004) in a list of links of the datasource 1002. Alternatively, the query can define blogroll links (e.g., BLOGROLL 1 LINK 1004 and BLOGROLL 2 LINK 1006) of the datasource 1002, such that the multiple links extend the search to the many blog sites.

Figure 11:
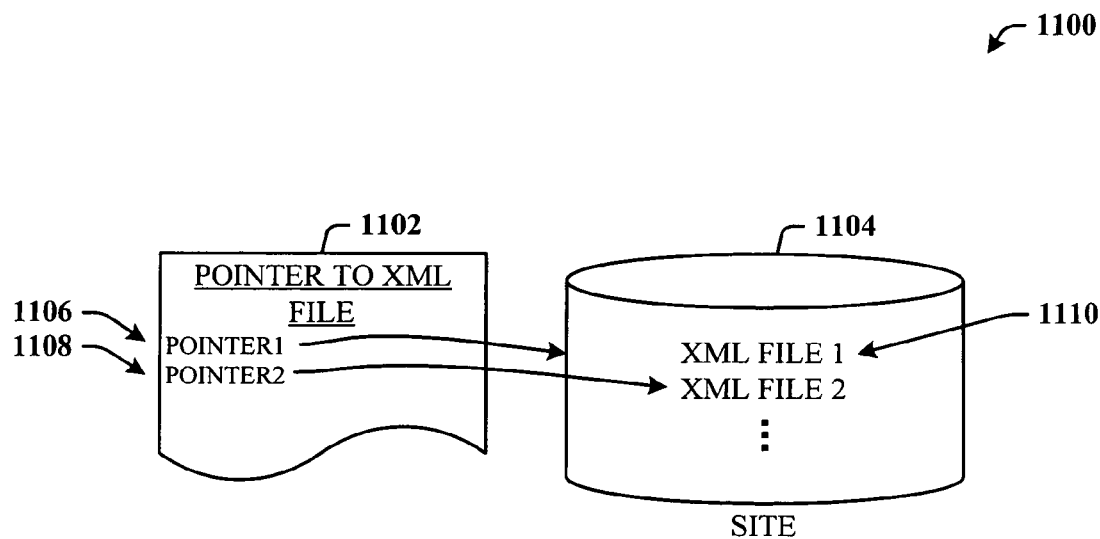
FIG. 11 illustrates a system that utilizes a datasource that includes a pointer to an XML file to link to a site.

FIG. 11 illustrates a system 1100 that utilizes a datasource 1102 that includes a pointer to an XML file to link to a site 1104. The datasource 1102 includes a list of pointers having at least a first pointer 1106 (denoted POINTER1) and a second pointer 1108 (denoted POINTER2). The first pointer 1106 directs the search query to the associated site 1104. The search can be limited to the site 1104 only, or extended to another site (not shown) as identified in a first XML file 1110 (denoted XML FILE 1) of the site 1104.

It is to be appreciated that the query can define a single pointer (e.g., POINTER1) in the list of pointers of the datasource 1102. Alternatively, the query can define multiple pointers (e.g., POINTER1 and POINTER2) of the datasource 1102, such that the multiple pointers extend the search to the many associated sites (e.g., blog and website). In another example, the second pointer 1108 can include sufficient destination information to direct the search to a specific XML file of the site 1104 (e.g., XML FILE 2). Thus, the search can be extended to the one or more associated sites (e.g., blog and website) defined in the XML FILE 2.

Figure 12:
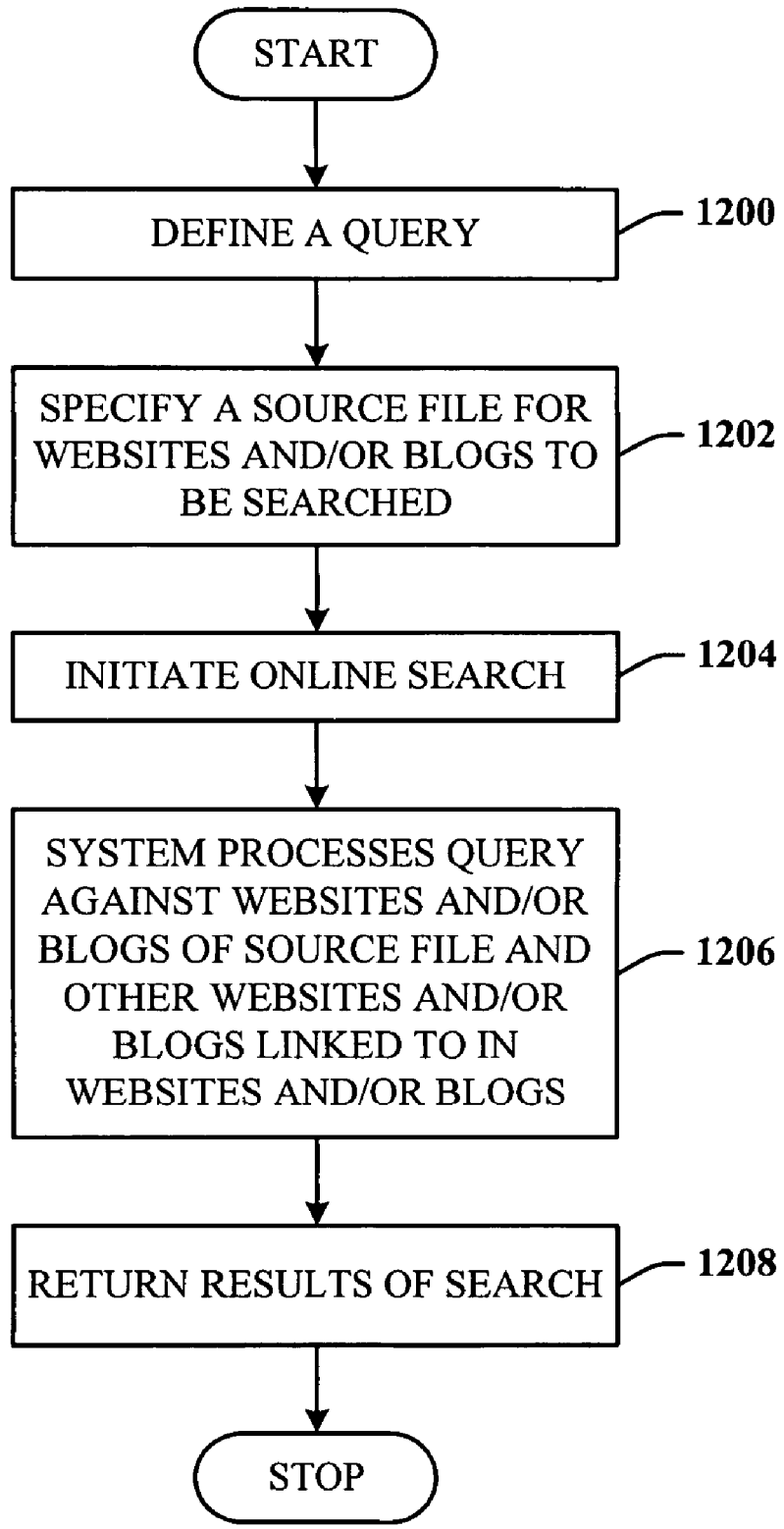
FIG. 12 illustrates a methodology of extending a search to multiple destinations.

FIG. 12 illustrates a methodology of extending a search to multiple destinations. At 1200, a query is defined that includes at least a destination and search terms. At 1202, a source file is specified in the search syntax that includes a website and/or a blog site to be searched. At 1204, the search is then initiated online. At 1206, the system processes the search query against a first site (e.g., a website and/or a blog site) of the source file, and other sites linked-to in the first site. At 1208, the search results are returned for processing.

Figure 13:
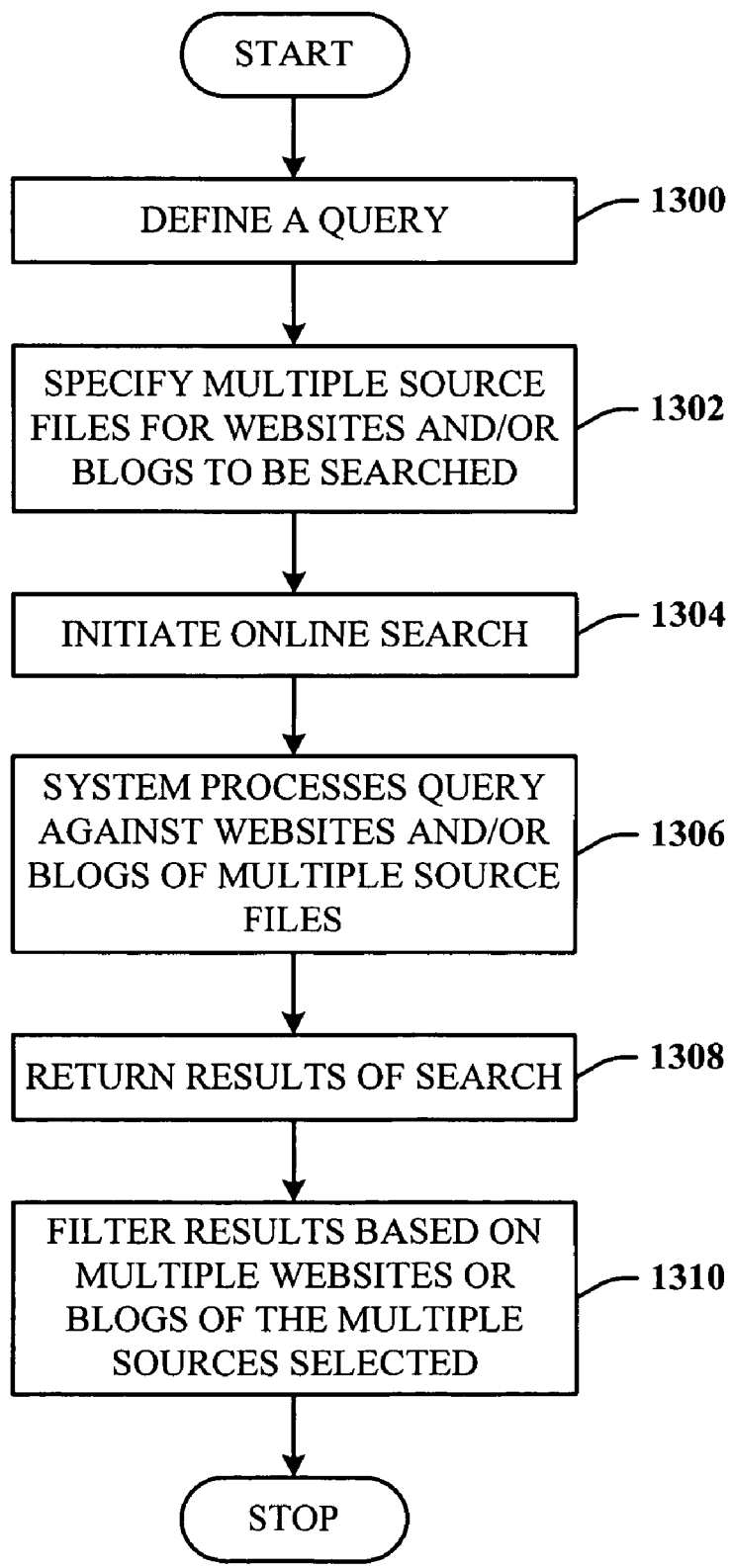
FIG. 13 illustrates a methodology of filtering search results based on multiple sites.

FIG. 13 illustrates a methodology of filtering search results based on multiple sites. At 1300, a query is defined that includes at least a destination and search terms. At 1302, multiple source files are specified in the search syntax that includes a website and/or a blog site to be searched. At 1304, the search is then initiated online. At 1306, the system processes the search query against sites (e.g., websites and/or blog sites) of the multiple source files. At 1308, the search results are returned for processing. At 1310, the results are filtered based on the multiple sites of the multiple sources selected in the source files.

Figure 14:
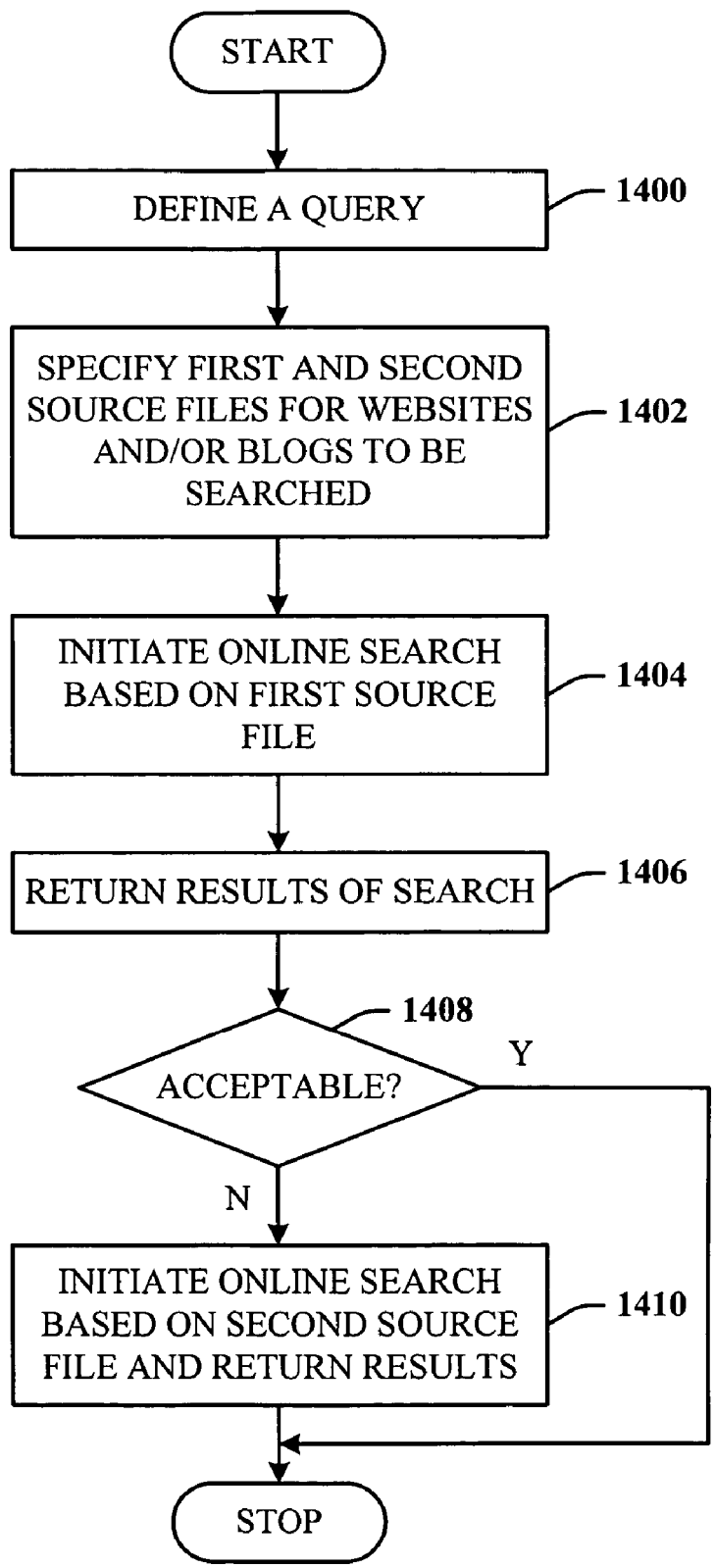
FIG. 14 illustrates a methodology of researching based on the quality of the results returned.

FIG. 14 illustrates a methodology of researching based on the quality of the results returned. At 1400, a query is defined that includes at least a destination and search terms. At 1402, first and second source files are specified for sites (e.g., website, blog site . . . ) to be searched. At 1404, the search is then initiated online based on the first source file. At 1406, the system processes the search query against sites (e.g., websites and/or blog sites) of the first source file and the search results are returned for processing. At 1408, a determination is made as to whether the results are acceptable. This can be based on predetermined criteria such as the number of results returns, the type of results returned, and the source of the results returned, for example. If not acceptable, flow is to 1410 to initiate an online search based on the second source file and return the results for processing. If, at 1408, the results are acceptable, flow can bypass utilization of the second source file to further the search.

Figure 15:
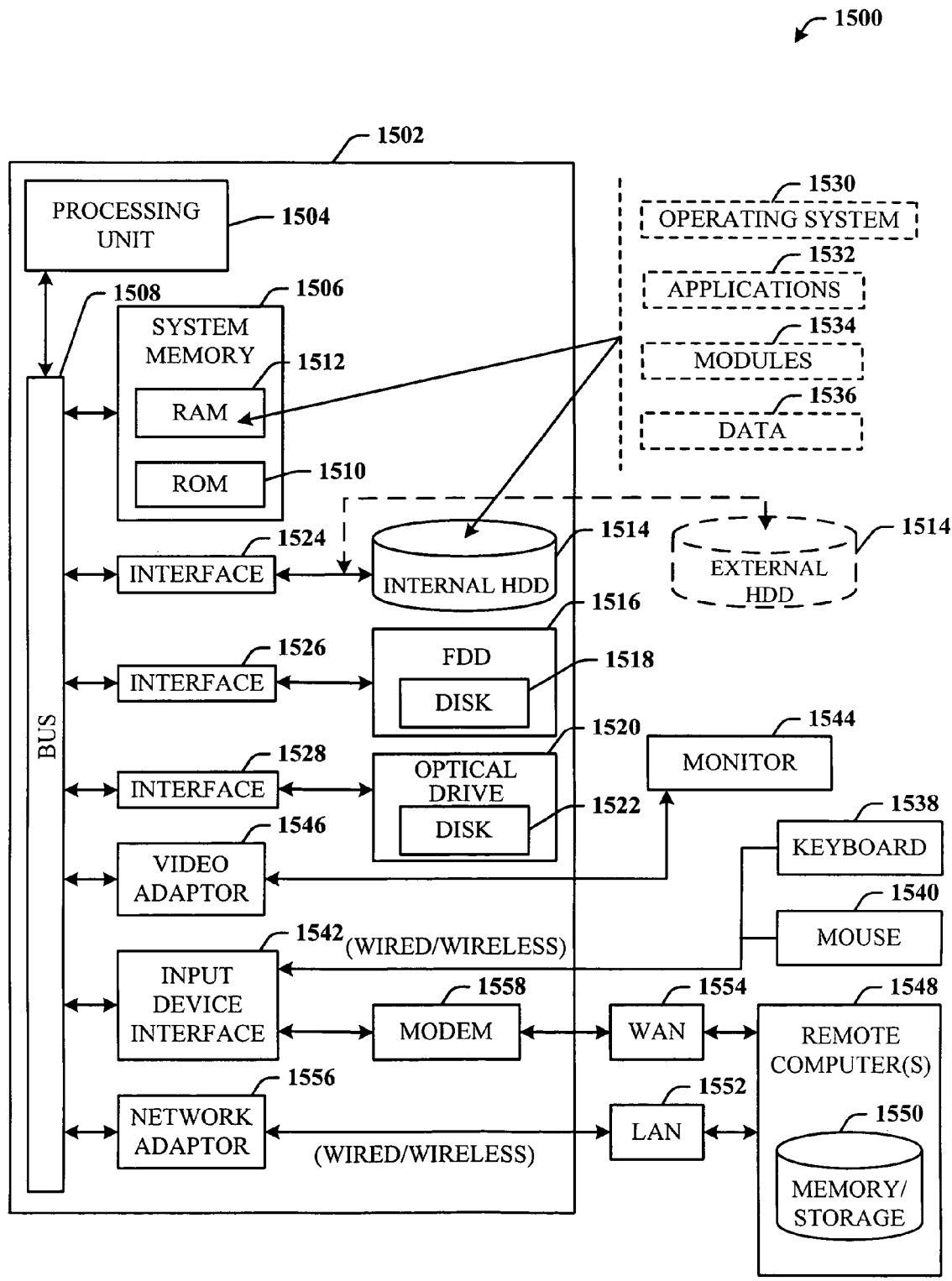
FIG. 15 illustrates a block diagram of a computer operable to execute the disclosed searching architecture.

Referring now to FIG. 15, there is illustrated a block diagram of a computer operable to execute the disclosed architecture. In order to provide additional context for various aspects thereof, FIG. 15 and the following discussion are intended to provide a brief, general description of a suitable computing environment 1500 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 15, the exemplary environment 1500 for implementing various aspects includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is to be appreciated that the innovation can be implemented with various commercially available operating systems or combinations of operating systems.

A user can enter commands and information into the computer 1502 through one or more wired/wireless input devices, e.g., a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 may operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which may connect to a global communications network, e.g., the Internet.

When used in a LAN networking environment, the computer 1502 is connected to the local network 1552 through a wired and/or wireless communication network interface or adapter 1556. The adaptor 1556 may facilitate wired or wireless communication to the LAN 1552, which may also include a wireless access point disposed thereon for communicating with the wireless adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 16:
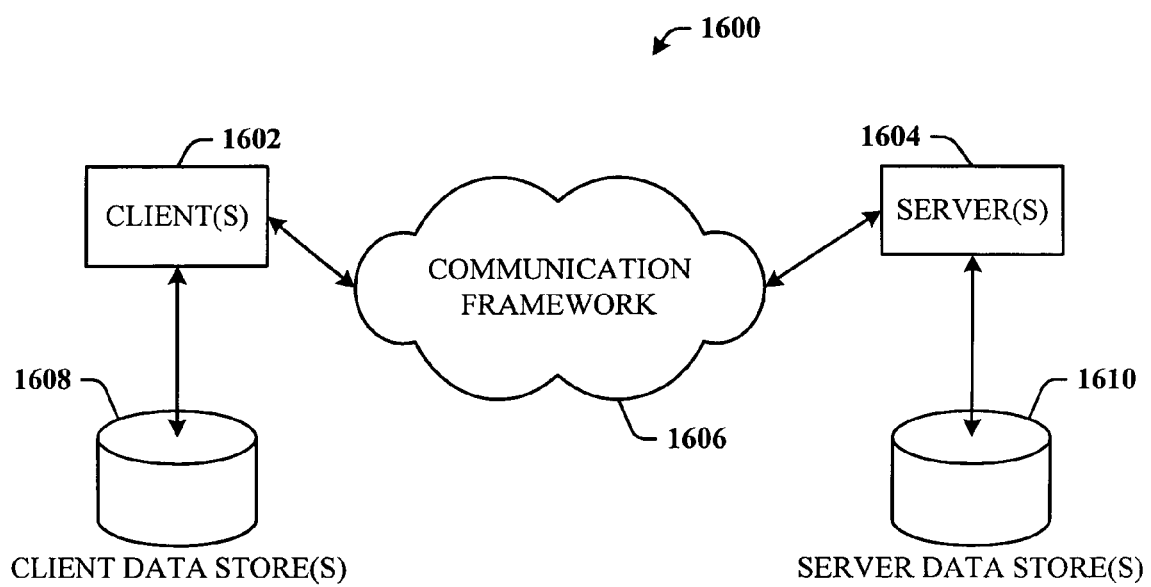
FIG. 16 illustrates a schematic block diagram of an exemplary computing environment.

Referring now to FIG. 16, there is illustrated a schematic block diagram of an exemplary computing environment 1600 in accordance with another aspect. The system 1600 includes one or more client(s) 1602. The client(s) 1602 can be hardware and/or software (e.g., threads, processes, computing devices). The client(s) 1602 can house cookie(s) and/or associated contextual information by employing the subject innovation, for example.

The system 1600 also includes one or more server(s) 1604. The server(s) 1604 can also be hardware and/or software (e.g., threads, processes, computing devices). The servers 1604 can house threads to perform transformations by employing the invention, for example. One possible communication between a client 1602 and a server 1604 can be in the form of a data packet adapted to be transmitted between two or more computer processes. The data packet may include a cookie and/or associated contextual information, for example. The system 1600 includes a communication framework 1606 (e.g., a global communication network such as the Internet) that can be employed to facilitate communications between the client(s) 1602 and the server(s) 1604.

Communications can be facilitated via a wired (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates data searching, comprising:
a computing device associated with one or more processors and one or more computer-storage media;
a data store coupled with the computing device;
a source component that includes data representative of at least one of a website and a blog site that is searched, wherein the source component stores the data in the form of a file that specifies the at least one of the website and the blog site that is searched, and wherein the file includes a single favorites list, multiple favorites lists, a blogroll, and a pointer to an XML file or an OPML (outline processor markup language) file; and
a search component that processes the data to restrict or bias a search based in part on the data, and that restricts the search to content of the website or blog site that is specified by the file and other sites or favorite lists linked to the website or blog site that is specified by the file, and wherein a source of a search destination is determined based upon a user login, such that a user logs-in to a system and defines a query, and the source of the search destination is automatically specified based on user login information,
wherein the search component performs a second search if results of the search are determined to be inadequate based on predetermined criteria including a number of the results returned, type of the results returned, and source of the results returned, and wherein the second search is restricted to content of a second specified website or a second specified blog site that is different than the specified website or blog site.

2. The system of claim 1, wherein the search component includes a parser component that retrieves a list of sites and enters site information into a query.

3. The system of claim 2, wherein the search component includes an execution component that executes the search according to filter data based on the list.

4. The system of claim 1, wherein the search component includes an index component that stores metadata structures to enable execution of the search.

5. Computer-readable storage media having computer-usable instructions embodied thereon that, when executed, perform a method of controlling a search, comprising:
  retrieving a first list of sites and a second list of sites, wherein each list includes at least one site that is searched, wherein the at least one site that is searched includes at least one of a blog site or a website;
  storing the first list in the form of a first file and the second list in the form of a second file, wherein each file defines the at least one site that is searched, wherein each file includes a single favorites list, multiple favorites lists, a blogroll, or a pointer to an XML file or an OPML (outline processor markup language) file, and wherein sites specified in the second list are different than sites specified in the first list;
  determining a source of a search destination based upon a user login;
  logging-in to a system using user login information and entering site destination information into a first query, wherein the source of the search destination is automatically specified based on the user login information;
  executing a first search utilizing the first query according to filter data based on the first list, wherein the first query restricts the search to content of the site that is specified by the first file;
  upon searching the site, determining whether the site includes a list of other sites;
  when the site includes a list of other sites, then extending the first search to the other sites; and
  determining whether results of the first search are adequate or inadequate based on predetermined criteria that includes number of the results returned, type of the results returned, and source of the results returned;
  when the results of the first search are determined to be inadequate, performing a second search utilizing a second query according to filter data based on the second list, wherein the second query restricts the search to content of a second website or second blog site that is specified by the second file and other sites or favorite lists linked to the second blog site or the second website based on the site destination information.

6. The media of claim 5, wherein the method further comprises storing metadata structures that enable execution of one or more of the first query and the second query.

7. The media of claim 5, wherein the method further comprises exposing correct metadata structures that enable execution of one or more of the first query and the second query.

8. The media of claim 5, wherein the method further comprises processing the first and second queries online.

9. The media of claim 5, wherein the method further comprises limiting the first and second queries to content of one or more sites on the first and second lists.

10. The media of claim 5, wherein the method further comprises extending the first or second search to multiple sites via the first or second list.

11. The media of claim 5, wherein the filter biases the first or second search based on one or more sites of the first or second list.

12. A system, comprising:
  a computing device associated with one or more processors and one or more computer-storage media;
  a data store coupled with the computing device;
  means for retrieving a document of data sites, wherein the document includes at least one of a blog site and a website to which a first search is restricted;
  means for storing the document in the form of a file that specifies the at least one of the specified blog site and the specified website to which the search is restricted, wherein the file includes a single favorites list, multiple favorites lists, a blogroll, or a pointer to an XML file or an OPML (outline processor markup language) file;
  means for determining a source of a search destination based upon a user login, wherein the search destination includes one or more sites to which the first search is restricted;
  means for logging-in to a system using user login information and entering site destination information of the data sites into a query, wherein the site destination information is obtained from the file and specifies the one or more sites to which the first search is restricted, and wherein the source of the search destination is automatically specified based on the user login information;
  means for storing metadata structures that enable efficient execution of the query;
  means for executing the query according to filter data based on the site destination information, wherein the query restricts the first search to content of a specified blog site or a specified website based on the site destination information;
  means for upon searching the specified blog site or the specified website,
    (A) determining that the specified blog site or the specified website includes a list of other sites, and
    (B) based on the determining, extending the search to the other Sites; and
  means for performing a second search if results of the first search are determined to be inadequate based on predetermined criteria including a number of the results returned, type of the results returned, and source of the results returned, wherein the second search is restricted to content of a second specified blog site or a second specified website that is different than the specified blog site or the specified website.

13. The system of claim 12, further comprising computer-implemented means for exposing correct metadata structures that enable execution of the query.

* * * * *

UNITED STATES PATENT AND TRADEMARK OFFICE
CERTIFICATE OF CORRECTION

| | | |
|---|---|---|
| PATENT NO. | : 8,005,810 B2 | Page 1 of 1 |
| APPLICATION NO. | : 11/239810 | |
| DATED | : August 23, 2011 | |
| INVENTOR(S) | : Ramez Naam et al. | |

It is certified that error appears in the above-identified patent and that said Letters Patent is hereby corrected as shown below:

In column 12, line 46, in Claim 12, delete "Sites;" and insert -- sites; --, therefor.

Signed and Sealed this
Fourth Day of October, 2011

David J. Kappos
*Director of the United States Patent and Trademark Office*